(12) United States Patent
Hildebrand et al.

(10) Patent No.: US 11,668,383 B2
(45) Date of Patent: Jun. 6, 2023

(54) STRAIN WAVE GEAR

(71) Applicant: Schaeffler Technologies AG & Co. KG, Herzogenaurach (DE)

(72) Inventors: Marco Hildebrand, Nuremberg (DE); Rainer Ottersbach, Aurachtal (DE); Daniel Heise, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 188 days.

(21) Appl. No.: 17/261,117

(22) PCT Filed: Jun. 7, 2019

(86) PCT No.: PCT/DE2019/100521
§ 371 (c)(1),
(2) Date: Jan. 18, 2021

(87) PCT Pub. No.: WO2020/020399
PCT Pub. Date: Jan. 30, 2020

(65) Prior Publication Data
US 2021/0317903 A1    Oct. 14, 2021

(30) Foreign Application Priority Data
Jul. 25, 2018 (DE) .................. 10 2018 117 950.2

(51) Int. Cl.
*F16H 49/00* (2006.01)
*F01L 1/352* (2006.01)

(52) U.S. Cl.
CPC ............ *F16H 49/001* (2013.01); *F01L 1/352* (2013.01); *F01L 2001/3521* (2013.01)

(58) Field of Classification Search
CPC ...................................... F16H 49/001
USPC ........................................... 74/640
See application file for complete search history.

(56) References Cited

U.S. PATENT DOCUMENTS

| | | | |
|---|---|---|---|
| 8,555,836 B2* | 10/2013 | David | F01L 1/352 123/90.31 |
| 9,528,401 B2* | 12/2016 | Otsubo | F16C 19/26 |
| 11,085,337 B2* | 8/2021 | Kinouchi | F01L 1/026 |
| 11,092,046 B2* | 8/2021 | Nakayama | F01L 1/352 |
| 11,326,681 B2* | 5/2022 | Preuss | F16H 49/001 |
| 2008/0083388 A1* | 4/2008 | Uehama | F01L 1/352 123/90.17 |
| 2009/0199797 A1* | 8/2009 | Schafer | F01L 1/34 74/568 R |
| 2010/0095919 A1* | 4/2010 | Myers | F01L 1/3442 464/160 |

FOREIGN PATENT DOCUMENTS

| | | |
|---|---|---|
| DE | 102013220220 A1 | 4/2015 |
| DE | 102015223419 A1 | 11/2016 |
| DE | 102016201536 A1 | 8/2017 |
| DE | 102016217051 A1 | 8/2017 |
| DE | 102016219076 A1 | 8/2017 |
| WO | 2005080757 A1 | 9/2005 |

* cited by examiner

*Primary Examiner* — Ha Dinh Ho

(57) ABSTRACT

A strain wave gear, in particular for an electromechanical camshaft adjuster, comprises a housing element, an internally toothed drive element connected thereto in a rotationally fixed manner, an elastic, externally toothed gear element, and an internally toothed output element. The drive element has positive locking elements with which it is connected to the housing element.

20 Claims, 2 Drawing Sheets

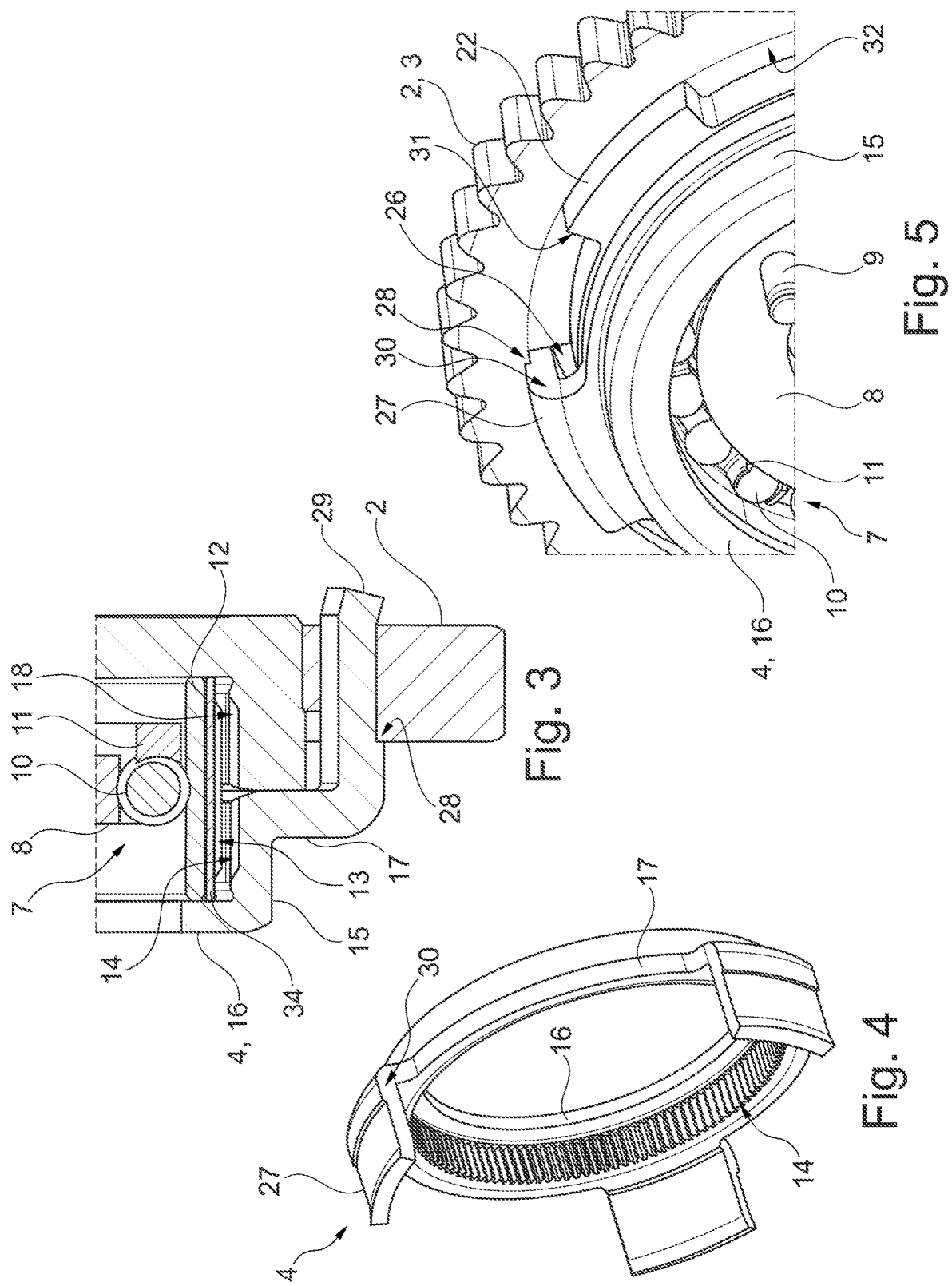

STRAIN WAVE GEAR

CROSS-REFERENCE TO RELATED APPLICATIONS

This application is the U.S. National Phase of PCT Application No. PCT/DE2019/100521 filed on Jun. 7, 2019 which claims priority to DE 10 2018 117 950.2 filed on Jul. 25, 2018, the entire disclosures of which are incorporated by reference herein.

TECHNICAL FIELD

This disclosure relates to a strain wave gear suitable for use in an electromechanical camshaft adjuster.

BACKGROUND

A generic strain wave gear is known for example from DE 10 2016 217 051 A1. This strain wave gear, which can be used as an actuating gear in a camshaft adjuster, comprises a drive wheel, an adjusting element in the form of an inner bearing ring, and an output element which is provided for connection to a camshaft. In this case, the drive wheel is mounted on the camshaft by means of a slide bearing.

Another strain wave gear of basically the same type is disclosed in DE 10 2016 219 076 A1. This strain wave gear also works with a flexible, externally toothed gear component, i.e., a flex ring. The outer toothing of the flex ring meshes with the inner toothing of a drive wheel and with the inner toothing of an output wheel designed as an internal gear. In addition to the flex ring, in the case of DE 10 2016 219 076 A1, the output wheel also has elastic properties.

A strain wave gear described in DE 10 2016 201 536 A1 has a flex ring, which is modified in comparison to the two cases mentioned at the outset in that it has an outer peripheral annular reinforcement.

In the case of a strain wave gear disclosed in DE 10 2015 223 419 A1, it is not the flex ring, but a flexible outer bearing ring connecting the flex ring, that has a modified shape. The modification is in the form of an outer material weakening of the outer ring.

SUMMARY

The object of the disclosure is to provide a strain wave gear which is further developed compared to the prior art mentioned and which is distinguished by a particularly compact, assembly-friendly construction and low moments of inertia.

According to the disclosure, this object is achieved by a strain wave gear with the features described herein. In a basic structure known per se, the strain wave gear comprises a housing element, a drive element connected thereto in a rotationally fixed manner and provided with internal teeth, an elastic, externally toothed gear element, and an internally toothed output element.

According to the disclosure, the drive element has positive locking elements with which it is connected to the housing element. The part of the strain wave gear referred to as the "housing element" does not necessarily imply that the strain wave gear has a closed housing. Depending on the field of application of the strain wave gear, the housing element can be a rotating or a non-rotating element. When using the strain wave gear in an electromechanical camshaft adjuster, the housing element is typically provided as a rotating element. If, on the other hand, the strain wave gear is used in a device for varying the compression ratio of a piston engine, the housing element is typically connected in a rotationally fixed manner to a non-rotating peripheral construction or is an integral part of this peripheral construction.

In any case, the fact that a positive locking connection is produced between the drive element and the housing element means that separate connecting elements, such as screws, locking rings or clamps, which hold the drive element on the housing element, are unnecessary. The positive locking connection produced without additional elements between the drive element and the housing element allows the transmission of forces and moments between the drive element and the housing element.

In an example embodiment, the positive locking elements are designed as push-in tabs which are pushed through openings in the housing element. The push-in tabs extend essentially in the axial direction of the drive element, i.e. parallel to the central axis of the strain wave gear. The number of push-in tabs is not subject to any theoretical restrictions. There are at least three push-in tabs and corresponding openings in the housing element. There can also be a higher number of push-in tabs, for example, six or eight push-in tabs.

A small number of push-in tabs, in particular an embodiment with exactly three push-in tabs, has the advantage that the push-in tabs are suitable for forming stop contours that are effective in the peripheral direction and interact with stop contours which are formed by the output element. If the strain wave gear is used as the actuating gear of an electromechanical camshaft adjuster, the stop contours limit the adjustment range of the camshaft adjuster.

The stop contours on the side of the output element are formed in an example embodiment by radially outwardly directed projections of the output element. The width of each projection measured in the peripheral direction deviates from the width of each push-in tab measured in the same direction, for example, by no more than 50%.

The output element can be slidably mounted within the strain wave gear. Here, the output element has two axial bearing surfaces with which it is mounted, on the one hand, with respect to the drive element and, on the other hand, with respect to the housing element. The axial bearing surface that supports the output element relative to the housing element can be formed by said projections.

In addition, the output element can also have a radial bearing surface which is effective with respect to the housing element and arranged on the side of the projections which faces away from the drive element and which describe separate segments of a flange. In a particularly space-saving design, the projections can engage in an annular shoulder on an inner peripheral surface of the housing element.

Regardless of whether the positive locking element of the drive element engages in openings in the housing element which have a closed edge, i.e., designed as bores, in particular in the form of slots, or interact with other holding contours of the housing element, each positive locking element of the fully assembled strain wave gear can have a deformed end section. This end section can be given its final shape, for example, by bending, caulking or flanging. In any case, the deformation means that the plurality of positive locking elements and thus the entire drive element are held on the housing element without play. The lack of play here relates at least to the tangential direction of the drive element. A connection without play in any direction can be provided between the drive element and the housing element. Here, in the direction in which the drive element is inserted into the housing element, a positive locking fit can be provided by a shoulder on each push-in tab, wherein the shoulder strikes directly on the housing element. In the opposite axial direction, on the other hand, the positive locking connection, which is also effective in the axial direction, is only generated by the deformation of the end sections of the positive locking elements. In principle, other connection technologies, such as clip or snap connections, are also conceivable between the drive element and the housing element.

The housing element of the strain wave gear can be designed as a gear element of a belt transmission, in particular as a chain wheel or belt wheel. It is also possible to connect a chain wheel or belt wheel as a separate element to the housing element.

The strain wave gear is not only suitable for applications in motor vehicle technology, but also as an actuating gear in industrial applications, for example within a machine tool or an industrial robot.

In the following, an exemplary embodiment of the disclosure is explained in more detail by means of a drawing. In the figures:

BRIEF DESCRIPTION OF THE DRAWINGS

FIG. 3 shows a detail of the strain wave gear in a sectional view,
FIG. 4 shows a drive element of the strain wave gear,
and
FIG. 5 shows a detail of the strain wave gear in a perspective view.

DETAILED DESCRIPTION OF THE EMBODIMENTS

Figure 2:
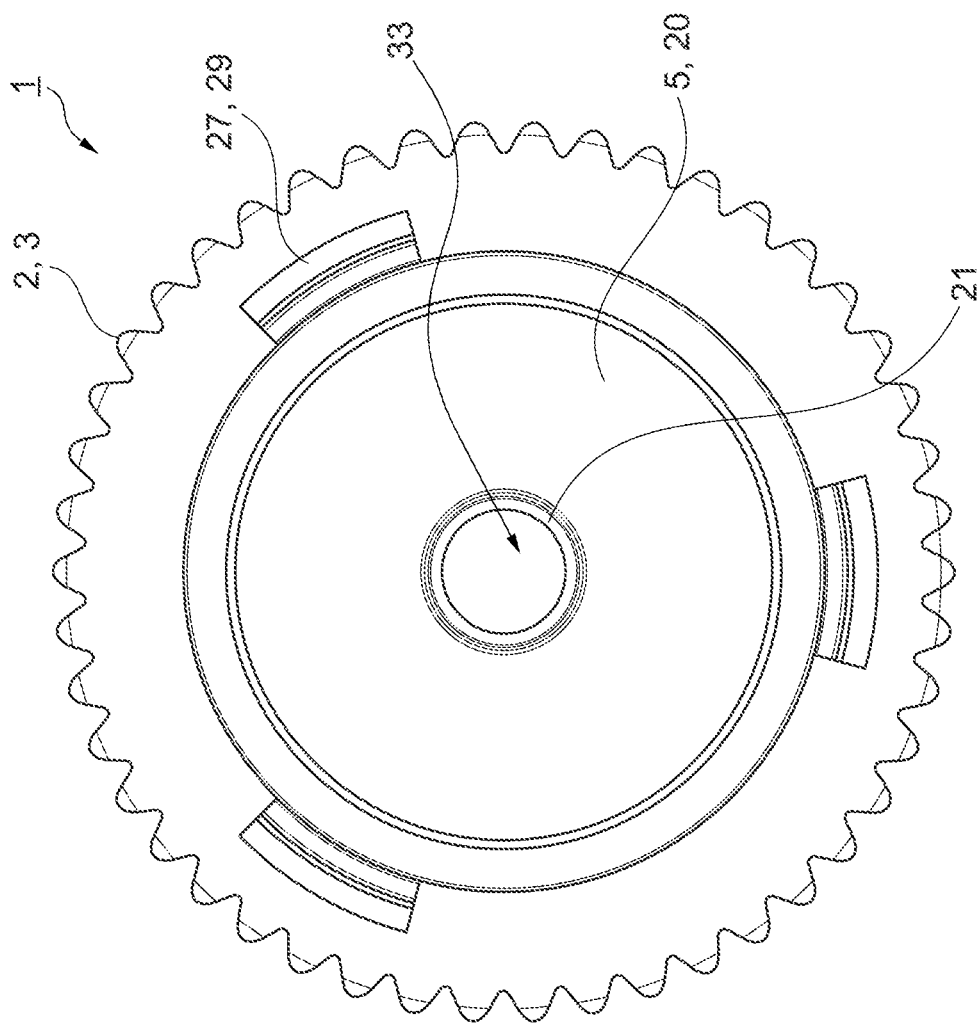
FIG. 2 shows the strain wave gear in an end view.
Figure 1:
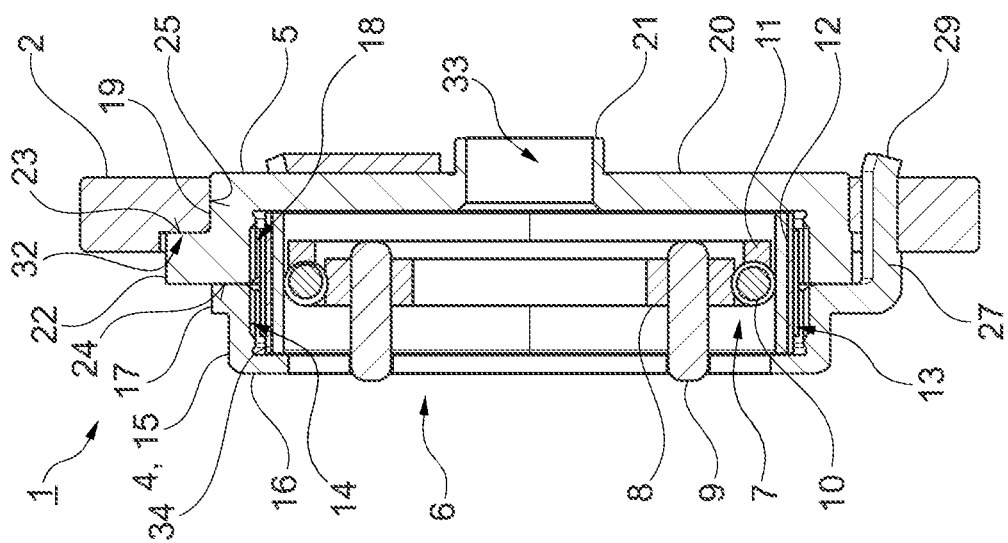
FIG. 1 shows a strain wave gear in a sectional view.

A strain wave gear, identified overall by reference symbol 1, is provided for use in an electromechanical camshaft adjuster, not shown further, of an internal combustion engine. With regard to the principle function of the strain wave gear 1, reference is made to the prior art cited at the outset.

The strain wave gear 1 comprises a housing element 2, which in the exemplary embodiment is formed in one piece with a chain wheel 3, which is driven via the crankshaft of the internal combustion engine. Furthermore, the strain wave gear 1 comprises an internal drive gear 4, which is generally referred to as a drive element and is fixedly connected to the housing element 2 in a manner explained in more detail below. In addition to the internal drive gear 4, an output element in the form of an internal output gear 5 is pivotally mounted in the housing element 2, wherein the internal drive gear 4 and the internal output gear 5 overlap— viewed in the axial direction of the internal gears 4, 5.

In the cavity formed by the internal drive gear 4 and the internal output gear 5 there is a wave generator 6 which has a ball bearing as a roller bearing 7. The roller bearing 7 comprises an inner ring 8 with a non-circular, elliptical outer contour. Bolts 9 inserted into the inner ring 8 cooperate with a compensating coupling, not shown. Via the compensating coupling, the inner ring 8 is driven by an electric motor, also not shown. Overall, the strain wave gear 1 is a three-shaft gear, wherein the three shafts are provided by the rotatable housing element 2, the internal output gear 5 and the electrically driven inner ring 8.

Balls 10, which are guided in a cage 11, roll on the non-circular contoured raceway of the inner ring 8. In contrast to the inner ring 8, the associated outer ring, designated 12, of the roller bearing 7 is designed as a thin-walled, flexible part and permanently adapts to the non-circular shape of the inner ring 8. As a result, an external toothing 13 of a flexible ring 34, which surrounds the outer ring 12 without being firmly connected thereto, is partially engaged with an internal toothing 14 of the internal drive gear 4 and with an internal toothing 18 of the internal output gear 5. The number of teeth of the internal toothing 14 corresponds to the number of teeth of the external toothing 13. Thus, the flex ring 34, which is generally referred to as a flexible transmission element, always remains in an unchanged angular position relative to the internal drive gear 4. Accordingly, the toothing pair 13, 14 is referred to as the coupling stage of the strain wave gear 1. In contrast, the number of teeth of the internal toothing 18 deviates slightly, namely by two, from the number of teeth of the external toothing 13. This has the effect that a full rotation of the inner ring 8 in relation to the housing element 2 is converted into a slight pivoting between the housing element 2 and the internal output gear 5. In the present case, the strain wave gear 1 is designed as a so-called plus gear, also referred to as a gear with a positive ratio. This means that the internal output gear 5 rotates in the same direction as the inner ring 8. Alternatively, it is also possible to design the strain wave gear 1 as a minus gear, i.e. as a gear with a negative transmission ratio.

The internal toothing 14 is located on a cylindrical section 15 of the internal drive gear 4. The cylindrical section 15 merges at an end face of the strain wave gear 1 into a radially inwardly directed inner rim 16. The inner rim 16 forms an axial stop in relation to the outer ring 12 and thus the entire wave generator 6. On the end face of the internal drive gear 4 opposite the inner rim 16, the latter has an outer rim 17 which limits the mobility of the internal output gear 5 in the axial direction. Here, an annular axial bearing surface 24 formed by the internal output gear 5 bears against the radially outwardly directed outer rim 17. The axial bearing surface 24 delimits a cylindrical section 19 of the internal output gear 5 shaped in the manner of a flat cup. The cylindrical section 19 merges on its side facing away from the axial bearing surface 24 into a non-closed base 20 which lies in a plane normal to the central axis of the internal gears 4, 5 and thus also to the axis of rotation of the camshaft to be adjusted. The base 20 merges at its inner edge into a pin 21 which projects out of the base 20 to the side of the camshaft to be adjusted. The opening delimited by the hollow pin 21 is designated 33. A central screw, not shown, is inserted through the opening 33 and is used to screw the internal output gear 5 to the camshaft.

From the cylindrical section 19 of the internal output gear 5, three projections 22 extend evenly, i.e. at 120° intervals, on the periphery, which are to be understood as individual segments of a radially outwardly directed, incomplete flange. An axial bearing surface 23 is provided by each projection 22 and bears against the housing element 2 in the area of an annular shoulder 32. The internal output gear 5 is thus supported in both axial directions by the axial bearing surfaces 23, 24 within the structural unit formed of the housing element 2 and the internal drive gear 4. Radial support is provided by a radial bearing surface 25, which is located in a region of the cylindrical section 19 between the projection 22 and the base 20. Thus, the internal output gear 5, apart from any possible bearing play, can be displaced neither in the radial nor in the axial direction with respect to the housing element 2.

In the housing element 2 there are three slot-shaped openings 26, through which a push-in tab 27 is guided, which is an integral part of the internal drive gear 4. The push-in tabs 27 are aligned essentially in the axial direction of the internal drive gear 4. In this case, a short, radially outward section adjoins the outer rim 17, which merges into a longer, axially aligned section of the push-in tab 27. The push-in tab 27, which is generally referred to as a positive locking element, thus has an angular shape overall. On each push-in tab 27, a shoulder 28 can be seen, which in the assembled strain wave gear 1 strikes at the edge of an opening 26 on the housing element 2.

The section of each push-in tab 27 protruding from the opening 26 is referred to as the end section 29. After the internal drive gear 4 and the housing element 2 have been pushed into one another, the end section 29 is deformed so far, in the present case radially outwardly, that the internal drive gear 4 is prevented from being pulled out of the housing element 2 in a positive locking manner. In addition, the deformation of the end section 29, which is to be carried out in the course of the manufacture of the strain wave gear 1, also causes a play-free connection in the peripheral direction between the internal drive gear 4 and the housing element 2.

The push-in tabs 27 are not only designed for a permanently fixed connection between the internal drive gear 4 and the housing element 2, but also as limiting elements effective in the peripheral direction with respect to the internal output gear 5. Peripheral stop surfaces of the push-in tabs 27 are designated 30. The peripheral stop surfaces 31, which are provided by each projection 22, can abut against the peripheral stop surfaces 30. Both peripheral stop surfaces 30, 31 protrude into the annular shoulder 32 on the inner peripheral surface of the housing element 2. Overall, a rotation angle limitation of the strain wave gear 1 is thus realized in the axial direction without additional space requirement of the strain wave gear 1. The strain wave gear 1 is thus particularly narrow compared to conventional solutions. By eliminating fasteners, such as screws, for connecting the internal drive gear 4 to the housing element 2, the number of parts of the strain wave gear 1 is also significantly reduced.

LIST OF REFERENCE SYMBOLS

1 Strain wave gear
2 Housing element
3 Chain wheel
4 Internal drive gear
5 Internal output gear
6 Wave generator
7 Roller bearing
8 Inner ring
9 Bolt
10 Ball
11 Cage
12 Outer Ring
13 External toothing
14 Internal toothing of the internal drive gear
15 Cylindrical section
16 Inner rim
17 Outer rim
18 Internal toothing of the internal output gear
19 Cylindrical section
20 Base
21 Cone
22 Projection
23 Axial bearing surface
24 Axial bearing surface
25 Radial bearing surface
26 Opening in the housing element
27 Push-in tab, positive locking element
28 Shoulder on the push-in tab
29 End section of the push-in tab
30 Peripheral stop surface of the push-in tab
31 Peripheral stop surface of the projection
32 Annular shoulder
33 Central opening in the output element
34 Flexible gear element, flex ring

The invention claimed is:

1. A strain wave gear, comprising:
a housing element,
an internally toothed drive element rotationally fixed to the housing element,
an elastic externally toothed gear element, and
an internally toothed output element, and
the drive element is connected to the housing element via positive locking elements,
wherein the positive locking elements are effective in an axial direction and in a peripheral direction.

2. The strain wave gear of claim 1, wherein the positive locking elements are configured as push-in tabs that are disposed within openings of the housing element.

3. The strain wave gear of claim 2, wherein the push-in tabs form stop contours effective in the peripheral direction and interact with stop contours of the output element.

4. The strain wave gear of claim 3, wherein the stop contours of the output element are formed by radially outwardly directed projections.

5. The strain wave gear of claim 4, wherein the output element has two axial bearing surfaces, a first axial bearing surface configured to mount the output element relative to the drive element and, a second axial bearing surface configured to mount the output element relative to the housing element, and the second axial bearing surface is formed by the projections.

6. The strain wave gear of claim 5, wherein the output element has a radial bearing surface configured to interface with the housing element, is the radial bearing surface arranged on a side of the projections facing away from the drive element.

7. The strain wave gear of claim 4, wherein the projections engage in an annular shoulder of the housing element.

8. The strain wave gear of claim 1, wherein the positive locking elements each have a deformed end section and are held at least in the peripheral direction without play on the housing element.

9. The strain wave gear of claim 1, wherein the housing element is configured as a chain wheel.

10. The strain wave gear of claim 1 arranged in an electromechanical camshaft adjuster.

11. A strain wave gear, comprising:
a housing,
an internally toothed drive gear having integrally formed axially extending tabs,
an internally toothed output gear, and
an elastic externally toothed gear, and
the drive gear rotationally fixed to the housing via the tabs of the drive gear.

12. The strain wave gear of claim 11, wherein at least one of the tabs includes a shoulder configured to abut with the housing.

13. The strain wave gear of claim 12, wherein the shoulder abuts with an edge of an opening, the opening configured to receive and guide the at least one of the tabs.

14. The strain wave gear of claim 11, wherein an end of the at least one of the tabs is configured to be deformed to fix the drive gear to the housing so that the drive gear is held to the housing without play in an axial direction.

15. The strain wave gear of claim 11, wherein the elastic externally toothed gear is arranged within a cavity formed by the internally toothed drive gear and the internally toothed output gear.

16. The strain wave gear of claim 11, wherein the tabs include first stop contours configured as rotational stops for the toothed output gear.

17. The strain wave gear of claim 16, wherein the toothed output gear has projections configured to abut with the first stop contours.

18. A strain wave gear, comprising:
a housing,
an internally toothed drive gear,
an internally toothed output gear, and
an elastic externally toothed gear, and
the housing having an opening configured to receive an integrally formed portion of the drive gear, the portion:
extending through the opening, and
configured to be deformed to rotationally fix the drive gear to the housing.

19. The strain wave gear of claim 18, wherein deformation of the portion fixes the drive gear to the housing so that the drive gear is held to the housing without play in an axial direction.

20. The strain wave gear of claim 18, wherein the integrally formed portion is configured as a rotational stop for the internally toothed output gear.

* * * * *